Dec. 26, 1933.   W. H. DE LANCEY   1,941,390
GAS AND LIQUID SEPARATOR
Filed Jan. 7, 1932    2 Sheets-Sheet 1

INVENTOR.
WARREN H. DE LANCEY
BY Chapin & Neal
ATTORNEYS.

Dec. 26, 1933. W. H. DE LANCEY 1,941,390
GAS AND LIQUID SEPARATOR
Filed Jan. 7, 1932   2 Sheets-Sheet 2
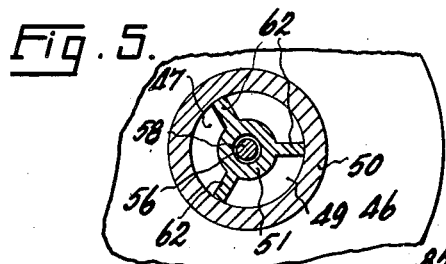
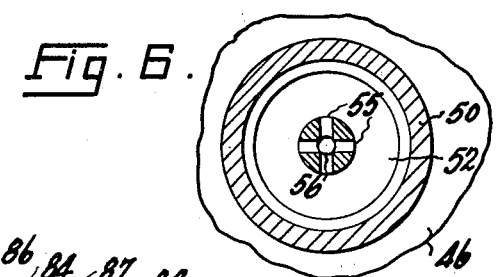
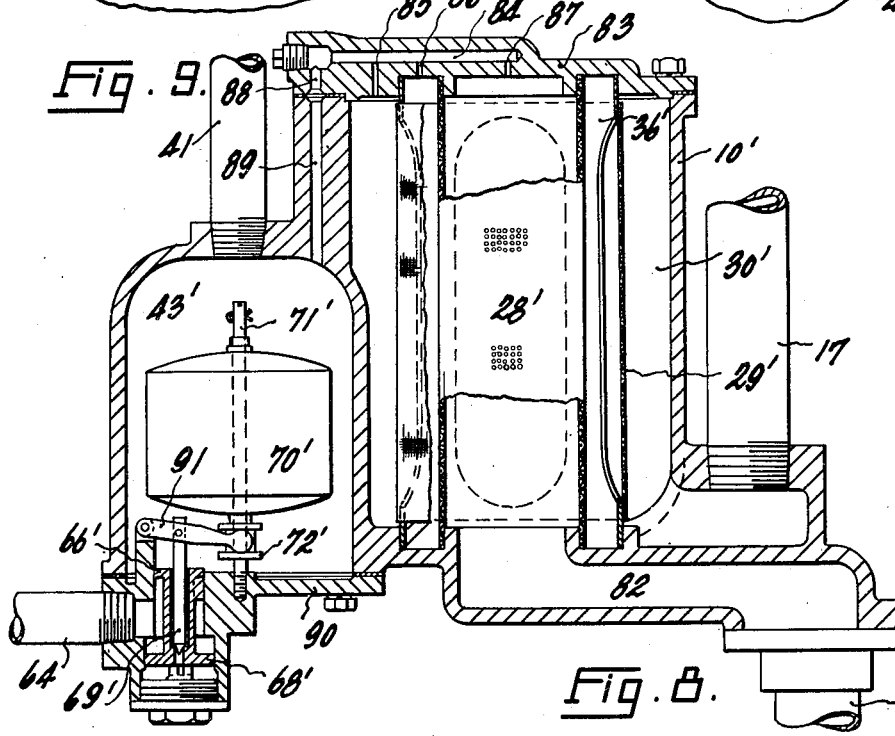
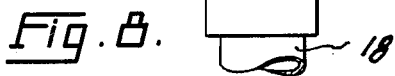
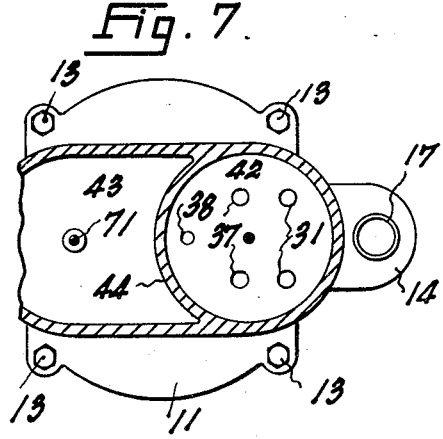
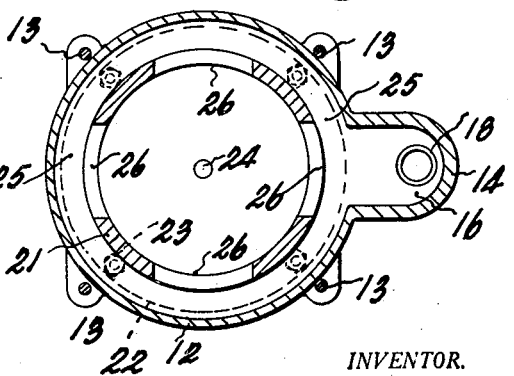
INVENTOR.
WARREN H. DE LANCEY
BY Chapin & Neal
ATTORNEYS.

UNITED STATES PATENT OFFICE 1,941,390

GAS AND LIQUID SEPARATOR

Warren H. De Lancey, Springfield, Mass., assignor to Gilbert & Barker Manufacturing Company, West Springfield, Mass., a corporation of Massachusetts Application January 7, 1932. Serial No. 585,280

4 Claims. (Cl. 183—2.5)

This invention relates to an improved separator for separating gases from liquids. The separator of this invention, while not limited thereto, finds one specific use in connection with gasoline dispensing apparatus in freeing the gasoline from air and vapors during its passage from the storage tank to the point of delivery.

Air separators, in various forms, are disclosed in the prior art. These function well enough, when used in the intended manner, in connection with dispensing systems, wherein the liquid is not constantly under substantial pressure. A common type includes a separator tank having an air outlet at its upper end, which outlet is valve controlled. In such cases the air outlet valve is operated by a float and is supposed to open when the liquid level falls a predetermined amount, and to close when the liquid rises to a predetermined level. If, in the separator tank, there are periods when the liquid is not under pressure greater than atmospheric, the float will open the air outlet valve, providing the liquid level is low. If, however, the liquid is constantly under pressure substantially greater than atmospheric, as it is in the so-called meter dispensing system, then an ordinary float operated valve will not open the valve, regardless of the level of the liquid, because the pressure, being greater than atmospheric, will hold the valve tightly to its seat, unless the float is made exceedingly large and so large as not to be feasible as a practical matter on account of space limitations.

An alternative form of prior art separator, not open to the same objection, is one in which the air outlet is constantly open but to a small degree. The disadvantages here are that the small outlet will not take care of all the air that may be pumped under some conditions and that it results in waste of power because the constantly open air outlet is really a leak in the pumping system. If no air is present, liquid will pass out through the air outlet and the power required to pump such liquid is wasted. Also, under special circumstances, for example when the gasoline tank runs dry, the pump will force a large amount of air into the separator and more than the constantly open but restricted air outlet can pass. Some of this air will have to pass to the meter and will operate it, giving a false indication. If the air outlet is increased in size to take care of this condition, then there is too great a loss of liquid through the air outlet ports during the normal operation.

This invention has for its general object the provision of an air separator which will function satisfactorily under all conditions encountered in a pressure type liquid dispensing system and one which is substantially fool-proof in operation.

More particularly, the separator has an air or gas outlet, which remains entirely closed when no air is present in the gasoline and which opens to variable degrees, depending on the amount of air present in the gasoline to meet the needs of every situation. In the event of operation under the extreme condition of the gasoline storage tank having run dry so that air only and no liquid is pumped, all the air will be passed out of the air outlet which opens widely and is large enough for the purpose, and no air will be forced to and through the meter to operate it.

A particular object of the invention is to provide fluid pressure means for actuating the air outlet valve and/or the liquid drain valve of the separator, either of which controls the passage of fluid from a region of higher pressure to a region of lower pressure and each of which is normally held closed by the pressure of the fluid that has to pass the valve. For this purpose, the fluid under pressure, which acts to hold the valve tightly to its seat, is passed under the control of a float operated needle valve into a cylinder to apply the pressure in an opposite direction to a piston of greater area than the valve and thereby force it open, irrespective of the degree of pressure acting on the valve to hold it to its seat.

Another object of the invention is to provide a separator in which the gases are separated from the liquids by a plurality of screens, and to mount these screens so that they may be conveniently removed by the act of removing the lower closure member of the separator.

Other objects relate to improvements in the construction and arrangement of parts and these and other objects will best appear as the detailed description proceeds and will be pointed out in the appended claims The invention will be disclosed with reference to the accompanying drawings, in which:—

Figure 1:
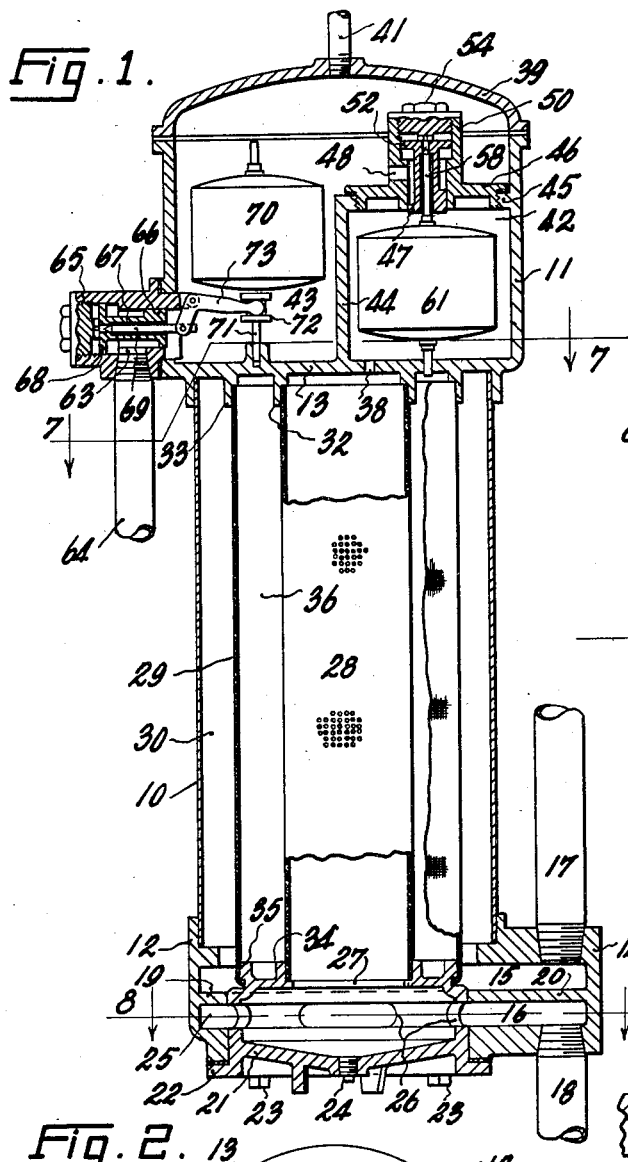
Fig. 1 is a sectional elevational view of an air separator embodying the invention.
Figure 3:
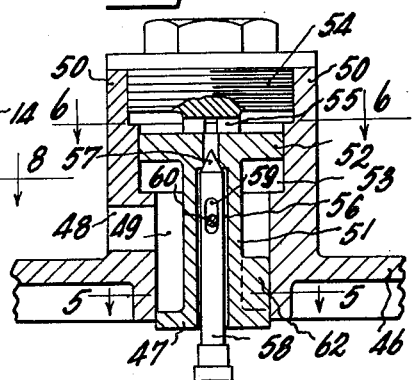
Fig. 3 is a full size fragmentary sectional view, taken similarly to Fig. 1, and showing the details of the air outlet valve and the controlling and actuating means therefor.

Figs. 5 and 6 are sectional plan views taken on the lines 5—5 and 6—6, respectively, of Fig. 3;

Figs. 7 and 8 are sectional plan views taken on the lines 7—7 and 8—8, respectively, of Fig. 1; and Fig. 9 is a sectional elevational view showing a modification of the invention.

Referring first to the preferred form of the invention shown in Figs. 1 to 8 inclusive of these drawings, the separator includes a tank (Fig. 1), composed of a cylindrical shell 10 and upper and lower heads 11 and 12, respectively, which are held together by suitable tie rods 13 (Figs. 7 and 8) to clamp the shell therebetween. The lower head 12 is a hollow casting and has a lateral extension 14, which is formed with upper and lower passages 15 and 16, respectively, extending radially into the interior of the hollow casting. These passages 15 and 16 communicate at all times with liquid outlet and inlet pipes 17 and 18 respectively. The head 12 also has an inwardly extending, horizontally disposed, annular flange 19, spaced above its bottom wall and aligning with the wall 20, which partitions the passages 15 and 16 In this flange 19, and in the bottom wall of head 12, are large and axially aligned circular openings of equal diameter, which receive and closely fit the periphery of a cup-shaped plug 21. This plug 21 has a flange 22, secured by bolts 23 (Fig. 8) to the lower outer face of head 12. The base of the cup shaped plug closes the lower end of the head 12 and has a central drain opening which is normally closed by a plug 24. Between flange 19 and the lower wall of head 12 is an annular passage 25 which communicates with inlet passage 16. The plug 21 has a plurality of angularly spaced ports 26 (Figs. 1 and 8) in its peripheral wall which communicate with the passage 25, and through which liquid may enter the interior of the hollow plug and pass upwardly through the central opening 27 in its upper end.

The separator includes inner and outer concentrically disposed cylindrical screens 28 and 29, and substantially all of the liquid is forced to pass radially first through the inner screen and then through the outer screen in order to reach the outer annular compartment 30, the lower part of which communicates with outlet passage 15. The lower head 12 closes the lower end of this compartment 30 except for the one outlet 15 for gas free liquid, and the upper head 11 closes the upper end of such compartment except for two air escape ports 31 (Fig. 7). These screens are received at their upper ends in circular openings formed in circular flanges 32 and 33 depending from head 11. The screens slidably engage such flanges. At their lower ends, the screens are suitably fixed to upstanding flanges 34 and 35 on plug 21. Consequently, by removing the plug, the screens can be withdrawn in assembled relation with it for cleaning. The annular compartment 36 between the two screens has air escape ports 37 (Fig. 7) formed in head 11 and the central compartment within the inner screen has an air escape port 38, also formed in head 11. The ports 38, 37 and 31 are of different sizes and afford areas progressively increasing in size in the order named. That is, the combined areas of the two ports 31 is greater than the combined areas of the two ports 37 and the combined areas of the ports 37 is greater than the area of the single port 38.

Figure 2:
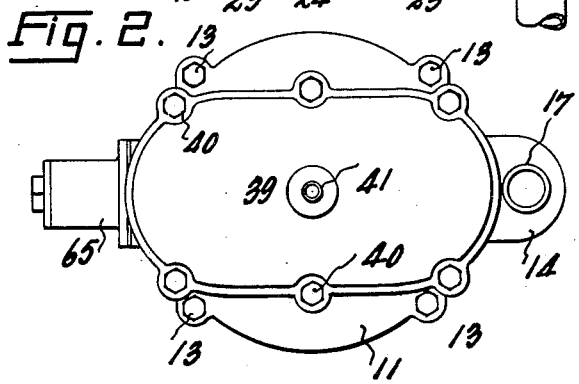
Fig. 2 is a top plan view thereof.

The upper head 11 is cup shaped and its open upper end is normally closed by a cap 39, secured thereto by cap screws 40 (Fig. 2). An air vent pipe 41 extends upwardly from cap 39. The interior of the hollow head 11 is subdivided into two float chambers 42 and 43 (Figs. 1 and 7). The latter is always in free communication with the vent pipe 41 and therefore under atmospheric pressure. The other float chamber 42 is divided off from chamber 43 by vertical and horizontal partitions 44 and 45, the latter having a removable plug section 46, containing a piston operated valve 47, controlling the single outlet 48, between the two float chambers. All of the air escape ports 31, 37 and 38 in head 11 communicate with the base of float chamber 42 (Fig. 7).

The construction and operation of the air outlet valve 47 will be best understood from Fig. 3. The valve 47 is a circular disc which slides in and normally substantially closes the lower end of a vertical passage 49, formed in an upstanding cylindrical extension 50 of plug 46. Integrally connected to valve 47 is an upstanding hollow stem 51, the upper end of which is connected to a piston 52. The latter slides in an upper passage or cylinder 53 in member 50, which passage is of larger diameter than passage 49 but in constant communication at its lower end therewith. A plug 54 closes the upper end of cylinder 53 and on its lower end carries stops 55 to limit the upward movement of piston 52. The shoulder formed by the intersection of passages 49 and 53 limits the downward movement of the piston. The annular space bounded by the stem 51 and the wall of passages 49 and 51 and by the piston 52 and valve 47 is always in communication with the outlet port 48 and therefore under atmospheric pressure. The stem 51 has an axial passage 56 extending completely therethrough and connecting the space below valve 47 to the space above piston 52. The stops 55 are arranged so as not to block the upper end of this passage (see Fig. 6). Intermediate the ends of passage 56 is a valve seat with which a needle valve 57 cooperates. The stem 58 of this valve is of smaller diameter than passage 56 and has a vertical slot 59 therein, through which passes a transverse pin 60 fixed in the wall of stem 51. The lower end of stem 58 carries a float 61. The valve stem 51 may be guided by vanes, such as 62 (see Fig. 5).

As air accumulates in chamber 42, the liquid level falls and float 61 moves downwardly carrying valve 57 away from its seat in passage 56. Fluid under pressure can then pass from chamber 42 upwardly through passage 56 into the space above the piston 52. The pressure of the fluid in chamber 42 acts upwardly on valve 47 tending to hold it closed, but it also acts downwardly on piston 52 and, since the latter has a greater area than valve 47, the latter will be moved downwardly, irrespective of the degree of pressure existing in chamber 42. The valve will move down until the seat in passage 56 engages the needle valve 57. It will then stop because the supply pressure fluid for actuating piston 52 is cut off. Valve 47 will move down until its upper face is below the lower end of passage 49. This will allow air to escape into the annular space surrounding stem 51 and thence through outlet 48. How much the valve 47 moves down depends on the necessities. It provides a variable air outlet, increasing or diminishing accordingly as there is need for venting a large or a small amount of air. As the liquid again rises, float 61 will rise and force needle valve 57 to its seat if not already so engaged. Then the fluid pressure acting on valve 47 and the rising float, will raise the valve. The valve 47 will, for all practical purposes, follow the float up and down, although it actually moves intermittently by small steps relatively thereto. The piston 52 fits loosely enough in its cylinder 53 to allow escape of liquid between the piston and cylinder as the piston rises. The valve 47 may also loosely fit its valve cylinder 49 and thus provide a constant but very restricted area for escape of air. The needle valve 57, being small, may be removed from its seat, even though the fluid in chamber 42 is under relatively heavy pressure, by a float of small size and one of greatly less size than would be required to open valve 47 directly under the same conditions.

The chamber 43 is a trap chamber for collecting such liquid as passes port 48. This chamber has an outlet 63 connected with a drain pipe 64. The outlet 63 is formed in the peripheral wall of a fitting 65, suitably and removably secured to a side-wall of the head 11, near the lower end of chamber 43. This fitting 65 is constructed in substantially the same way as member 50 to receive a piston valve 66 which is connected by a hollow stem 67 to a piston 68. A needle valve 69 controls the admission of fluid from chamber 43 through the hollow stem to the left hand side of piston 68. This needle valve is operated by a float 70 in chamber 43 to open when the liquid accumulates in the chamber above a predetermined level. In this case, float 70 is mounted for vertical sliding movement on a guide rod 71, fixed to and upstanding from head 11, and carries a clutch collar 72 in which the forked end of one arm of a bellcrank 73 engages. This bellcrank is pivoted to the inner end of fitting 65 and its other arm is pivotally connected to the inner end of the needle valve. By removing the fitting 65, the valve unit, including the needle valve and its actuating bellcrank, will come with it,—the forked end of the bellcrank drawing free of the clutch collar on float 70. It is thought that further detailed description of this valve unit will be unnecessary as its construction and operation is essentially the same as the valve unit in chamber 42.

Figure 4:
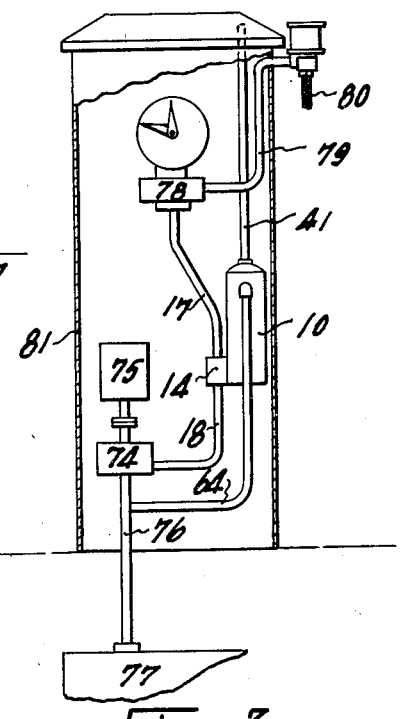
Fig. 4 is a small scale diagrammatical view, showing the application of the separator to a gasoline dispenser.

The separator when used in a gasoline dispensing system is usually piped up as shown in conventional form in Fig. 4. The liquid inlet pipe 18 is connected to the outlet of a pump 74, such as a rotary pump which is continuously driven whenever the dispensing apparatus is in operation, as by an electric motor 75. The intake of the pump 74 is connected by a suction pipe 76 to the gasoline storage tank 77, usually located underground as indicated. The liquid outlet pipe 17 of the separator extends to a suitable meter 78 and from the meter a pipe 79 extends for connection to the usual flexible discharge hose 80. The outlet end of this hose is normally closed and the normal condition of the dispensing system is that it is entirely filled with gasoline up to the delivery end of hose 80 and usually under a substantial pressure. The apparatus is usually enclosed in a casing, such as 81, and the air vent pipe 41 extends upwardly to the top of casing 81 to as high a level as possible. The drain pipe 64 is preferably connected to the suction pipe 76.

It will thus be seen that a condition of partial vacuum exists at the outlet port 63 of chamber 43 and also in the space surrounding the hollow stem 67 and between valve 66 and piston 68. Consequently, when the needle valve 69 is moved away from its seat due to the rising of float 70 by the liquid accumulated in chamber 43, liquid under atmospheric pressure will be admitted to the left hand side of piston 68 and this pressure, being greater than that in the said space, will move the piston to the right and open valve 66, allowing liquid to drain from the chamber 43 into pipe 64 until the falling of the float closes the needle valve 69. As before, the area of valve 66 is less than that of piston 68, so that the total pressure in the piston tending to move it to the right is greater than that acting on the valve 64 tending to hold it in the illustrated position. As before, the valve 64 moves step by step in small increments and for all practical purposes follows along with the needle valve, opening according to the needs as manifested by the level of liquid accumulated in the trap chamber. Thus, a variable outlet for liquid is provided and one that can open wide enough to prevent flooding of chamber 43 and the forcing of liquid up, through, and out of the open end of the vent pipe 41.

A modification of the invention is shown in Fig. 9. The separator tank 10' contains inner and outer screens 28' and 29' which subdivide the tank into an outer and exit compartment 30', an intermediate compartment 36' and a central compartment. Liquid enters from pipe 18 through a cored passage 82 in the base of tank 10' into the lower end of the central compartment. Liquid passes through screens 28' and 29' into the outer compartment 30' and leaves by way of pipe 17. The upper end of tank 10' consists of a removable head 83 having therein a horizontal passage 84 which is in constant but restricted communication with the compartments 30', 29' and the central compartment by means of small holes 85, 86 and 87 respectively. The only other communication of passage 84 is with a short vertical passage 88 in cap 83 and passage 88 registers with a vertical passage 89 in the wall of tank 10'. Passage 89 opens into the upper end of a trap chamber 43' to which end the vent pipe 41 is also connected. The lower wall of chamber 43' consists of a removable head 90, to which is connected the drain pipe 64 and in which is a pressure operated outlet valve 66'. The construction of this valve is like the valves 66 and 47 and therefore need not be described in detail. The needle valve 69', which controls the admission of pressure fluid to piston 68' is connected to a lever 91, pivoted at one end to head 90. The other end of lever 91 is forked to engage a clutch collar 72' carried by a float 70', which is slidably mounted on a guide rod 71' fixed to head 90. By removing this head, the valve and associated parts, including the float mechanism, may be removed as one unit with all parts in assembled relation.

The operation of the preferred form of the invention will next be described. It is to be noted that, when the separator is used in the dispensing system shown in Fig. 4, the liquid in the separator is always under pressure and that, when the motor 75 is in operation with the outlet of hose 80 closed, as it often is for short intervals, that a substantial pressure may build up in the system. It is not unusual to have a pressure in the system of from 15 to 20 pounds per square inch and under some conditions it may momentarily run much higher. The pump 74 is of the type having a relief-valve-controlled by-pass incorporated therein and arranged to interconnect the pump inlet and outlet, when the pressure exceeds a predetermined degree. A realization of this constant pressure condition will make apparent the necessity for a separator having the special provisions above described for releasing trapped air, whenever it accumulates, irrespective of the amount of pressure to which it is subjected. The valve 47, being opened by fluid pressure, will always effectively function no matter what pressure exists in tank 10. This is a vital feature of the invention and the provision of the air outlet valve, operable to open by fluid pressure, makes possible the successful practical operation of the separator under conditions, such as those described, where ordinary separators, such as those heretofore provided for use with hand operated pumps would not effectively function.

The separation of air and liquid is effectively accomplished by the screens 28 and 29. These substantially prevent the passage of air bubbles through them. The greater part of the air entering with the liquid through pipe 18, will be retained by the inner screen 28 and, not being able to pass this screen, it will work its way upwardly to the top of the inner compartment and escape through hole 38 into chamber 42. Perhaps ninety per cent of the air will be retained in the inner compartment by screen 28 and the remainder will be retained by screen 29 and rise to the top of the intermediate compartment and escape into float chamber 42 by way of holes 37. Substantially gas-free liquid is received in the outer compartment but should there be any air or other gases therein, there is an outlet from them by way of holes 31 into float chamber 42. The separation of the gases from the liquid is exceedingly effective. The screens also serve as filters and to break up any swirling motion of the liquid. Separation of air from liquid is more effectively accomplished if the liquid is in a quiescent state and the screens tend to make the liquid assume such state.

It will be appreciated that there is a drop in pressure between the central and the intermediate compartments and between the intermediate and outer compartments. That is, there is necessarily some pressure loss incident to the work of forcing liquid through the fine screens 28 and 29. On the other hand, the outlets 31, 37 and 38 into float chamber 42 afford easier paths for the liquid and it might be possible for liquid leaving the inner compartment through opening 38 to enter the intermediate compartment by way of holes 37, or the outer compartment by way of holes 31, and thus escape passage through one or both of the screens. To avoid this condition and prevent as far as possible cross flow of liquid from one compartment to the other by way of chamber 42, the areas of the openings 31, 37 and 38 have been so chosen that when multiplied by the pressure existing in the underlying compartment, the result is a constant.

The air entering chamber 42 will be forced to the top and trapped there until the air valve 47 opens, except that if desired some small volume of air may pass through the clearance space between the valve and its cylinder and escape through port 48. Liquid will enter chamber 42 to varying degrees depending on the amount of air accumulated. When sufficient air accumulates, the level of the liquid is forced down and float 61 falls, opening needle valve 57 and admitting fluid under pressure to the upper side of piston 52. This drives the piston down and opens valve 47 allowing trapped air to escape to chamber 43. If air is not vented rapidly enough, float 61 will move a step lower and valve 47 will be driven down by pressure to create a still greater opening. Thus, the valve opens according to the needs as manifested by the position of float 61. It is to be here noted that the air openings 80 are large enough to vent all the air that pump 74 can pump. If tank 77 runs dry and the pump 74 is forcing nothing but air, the separator will pass all this air out into chamber 43 and thence through vent pipe 41 without any of it passing through liquid outlet pipe 17 to operate the meter 78.

The air and with it some liquid escapes into chamber 43, the air passing up vent pipe 41 and the liquid falling to the bottom of the trap chamber. If some liquid does enter pipe 41, it will eventually fall back into the trap chamber and, because of the length of the pipe, liquid is never likely to escape through the open upper end of this pipe. Liquid accumulating in chamber 43 is returned from time to time to the suction pipe of pump 74. The float 70 rises as liquid accumulates and opens the needle valve 69 to admit the liquid under atmospheric pressure to the left side of piston 68, whereby the latter is moved to the right to open valve 66 and allow liquid to escape into pipe 64, in which sub-atmospheric pressure exists. Here again, the valve is positively opened and to a variable degree according to requirements. By reason of the positively opening valve 66, the separator cannot be flooded. The drain 64 will take care of all liquid which can be pumped and avoid any possibility of vent pipe 41 being filled to overflowing.

The separator of Fig. 9 operates in the same way except that the air outlet valve is omitted. This is not as desirable a solution of the problem but it will serve the needs of many cases. The constantly open air escape ports are less desirable than an air port which is normally closed and opens only when air is present. When there is no air to be vented, the constantly open ports permit escape of liquid. There is a leak which means to some extent a power loss. Some of the effort required to drive the pump 74 is wasted. Nevertheless, this separator of Fig. 9 will function satisfactorily under many conditions although it lacks the advantages of an air outlet which is variable according to the amount of air entering with the liquid.

The provision of the pressure operated valves 47 and 66 not only enables them to operate under heavy pressure regardless of the degree thereof, but it enables the valves to be controlled by floats of small size and in this way enables the apparatus to be made more compactly. It would not be possible to open these valves under continuous heavy pressure if directly connected to the floats in the ordinary way, unless these floats were exceedingly large and so large that it would not be possible to house them in the separator structure shown or one of any reasonable size.

There are desirable features in the mechanical construction of the separator. The mounting of the screens 28 and 29 for quick and convenient removal with the plug 21 in the lower head 12 is thought important. The arrangement of parts which enables free access to the float chambers 42 and 43 and the mounting of the valves 47 and 66 with their associated parts in removable members, such as 50 and 65, whereby each mechanism may be quickly and conveniently removed as a unit with all parts retained in assembled relation, are important features.

The invention has been disclosed herein, for illustrative purposes but the scope of the invention is defined by the appended claims rather than by the foregoing description.

What I claim is:

1. A gas and liquid separator, comprising, a tank having upper and lower heads, and a plurality of screens mounted between the heads and one within another subdividing said tank into extreme outer, intermediate and extreme inner compartments, said lower head having a liquid inlet into one of said extreme compartments and a liquid outlet from the other extreme compartment and being otherwise closed, said upper head having gas escape ports for said compartments, the escape port area for the several compartments being of different area and increasing progressively in area from the inlet compartment to the outlet compartment.

2. A gas and liquid separator, comprising, a tank having upper and lower heads, and a plurality of screens mounted between the heads and one within another subdividing said tank into extreme outer, intermediate and extreme inner compartments, said lower head having a liquid inlet into one of said extreme compartments and a liquid outlet from the other extreme compartment and being otherwise closed, said upper head being hollow and affording two float chambers one of which is open at all times to the atmosphere and the other of which is open at all times to said several compartments, a passage formed in the upper head for interconnecting said chambers, a valve controlling said passage, and a float in the second named chamber controlling said valve, a float in the first named chamber, said chamber having an outlet for liquid, and a valve controlling said outlet and in turn controlled by the last named float.

3. A gas and liquid separator, comprising, a tank having upper and lower heads, and a plurality of screens mounted between the heads and one within another subdividing said tank into extreme outer, intermediate and extreme inner compartments, said lower head having a liquid inlet into one of said extreme compartments and a liquid outlet from the other extreme compartment and being otherwise closed, said upper head having gas escape ports therethrough for said several compartments and extending upwardly to form a float chamber with which said ports communicate, a float in said chamber, the latter having an outlet near its upper end, and a valve controlling said outlet and in turn controlled by said float, said chamber having an opening in its upper wall of a size such that the float may pass therethrough, a removable closure for said opening and in which said outlet is formed and in which said valve is mounted.

4. A gas and liquid separator, comprising, a tank having upper and lower heads and a shell connecting them, the upper head having a gas escape port and the lower head having inlet and outlet ports for liquid, said inlet and outlet ports entering the periphery of the head at different levels, said lower head having a removable plug, a screen extending between said heads and attached to said plug to be removed therewith, said plug partitioning the tank between said levels and having a passage therein leading from the interior to said screen to and through the periphery of the plug at a point such as to communicate with the lower of said ports, the upper port communicating with the portion of said tank which lies outside said screen.

WARREN H. DE LANCEY.